(12) United States Patent
Falk et al.

(10) Patent No.: US 9,569,794 B2
(45) Date of Patent: Feb. 14, 2017

(54) APPARATUS AND METHOD FOR MANAGING DATA RECORDS FOR ASSOCIATED SEALS FROM PRODUCTS

(71) Applicant: Siemens Aktiengesellschaft, Munich (DE)

(72) Inventors: Rainer Falk, Poing (DE); Thomas Falk, Kelsterbach (DE)

(73) Assignee: Siemens Aktiengesellschaft, Munich (DE)

( * ) Notice: Subject to any disclaimer, the term of this patent is extended or adjusted under 35 U.S.C. 154(b) by 17 days.

(21) Appl. No.: 14/429,284

(22) PCT Filed: Aug. 26, 2013

(86) PCT No.: PCT/EP2013/067596
§ 371 (c)(1),
(2) Date: Mar. 18, 2015

(87) PCT Pub. No.: WO2014/044492
PCT Pub. Date: Mar. 27, 2014

(65) Prior Publication Data
US 2015/0287112 A1  Oct. 8, 2015

(30) Foreign Application Priority Data
Sep. 19, 2012 (DE) .................. 10 2012 216 764

(51) Int. Cl.
*G06K 7/10* (2006.01)
*G06Q 30/06* (2012.01)
*G06K 19/077* (2006.01)

(52) U.S. Cl.
CPC ........... *G06Q 30/0609* (2013.01); *G06K 7/10* (2013.01); *G06K 19/07726* (2013.01)

(58) Field of Classification Search
CPC ........................................... G06K 7/10
See application file for complete search history.

(56) References Cited

U.S. PATENT DOCUMENTS

| 5,704,097 A | 1/1998 | Rahav | |
| 6,550,681 B1* | 4/2003 | Ross | H05B 6/6438 219/506 |

(Continued)

FOREIGN PATENT DOCUMENTS

| CN | 1813272 | 8/2006 |
| CN | 101356538 | 1/2009 |

(Continued)

OTHER PUBLICATIONS

Office Action dated Sep. 28, 2016 which issued in the corresponding Chinese Patent Application No. 201380048164.5.

*Primary Examiner* — Christle I Marshall
(74) *Attorney, Agent, or Firm* — Cozen O'Connor

(57) ABSTRACT

An apparatus is configured to manage N data records for N associated seals from products. The apparatus includes a reception unit configured to receive a challenge message, sent by a capture appliance, with a code associated with one of the N seals. There is a checking unit configured to check the received code for validity and for a first breakage of the seal associated with the received code on the basis of the data record associated with the associated seal. A transmission unit is configured to send a response message, generated on the basis of the check, with a piece of status information pertaining to the first breakage of the seal associated with the received code to the capture appliance.

15 Claims, 2 Drawing Sheets

(56) References Cited

U.S. PATENT DOCUMENTS

| | | | |
|---|---|---|---|
| 6,665,585 B2 | 12/2003 | Kawase | |
| 7,580,895 B2 | 8/2009 | Wilde et al. | |
| 8,606,716 B2 | 12/2013 | Wilde et al. | |
| 2004/0034579 A1* | 2/2004 | Xu | G06Q 30/02 |
| | | | 705/28 |
| 2006/0100964 A1 | 5/2006 | Wilde et al. | |
| 2008/0046114 A1* | 2/2008 | White | G06Q 10/08 |
| | | | 700/215 |
| 2009/0006255 A1 | 1/2009 | Bychkov et al. | |
| 2009/0045918 A1 | 2/2009 | Droesler et al. | |
| 2009/0091457 A1* | 4/2009 | Kresse | C09J 7/0296 |
| | | | 340/572.8 |
| 2009/0276360 A1 | 11/2009 | Wilde et al. | |
| 2011/0082795 A1 | 4/2011 | Wilde et al. | |
| 2011/0115631 A1 | 5/2011 | Droesler et al. | |
| 2013/0292462 A1* | 11/2013 | Hoffman | G06F 17/30017 |
| | | | 235/375 |

FOREIGN PATENT DOCUMENTS

| | | |
|---|---|---|
| CN | 101390112 | 3/2009 |
| DE | 19838913 A1 | 10/1999 |
| DE | 10328328 A1 | 1/2005 |
| DE | 102005033409 A1 | 1/2007 |
| DE | 102006010159 A1 | 9/2007 |
| DE | 102007019839 A1 | 10/2008 |

\* cited by examiner

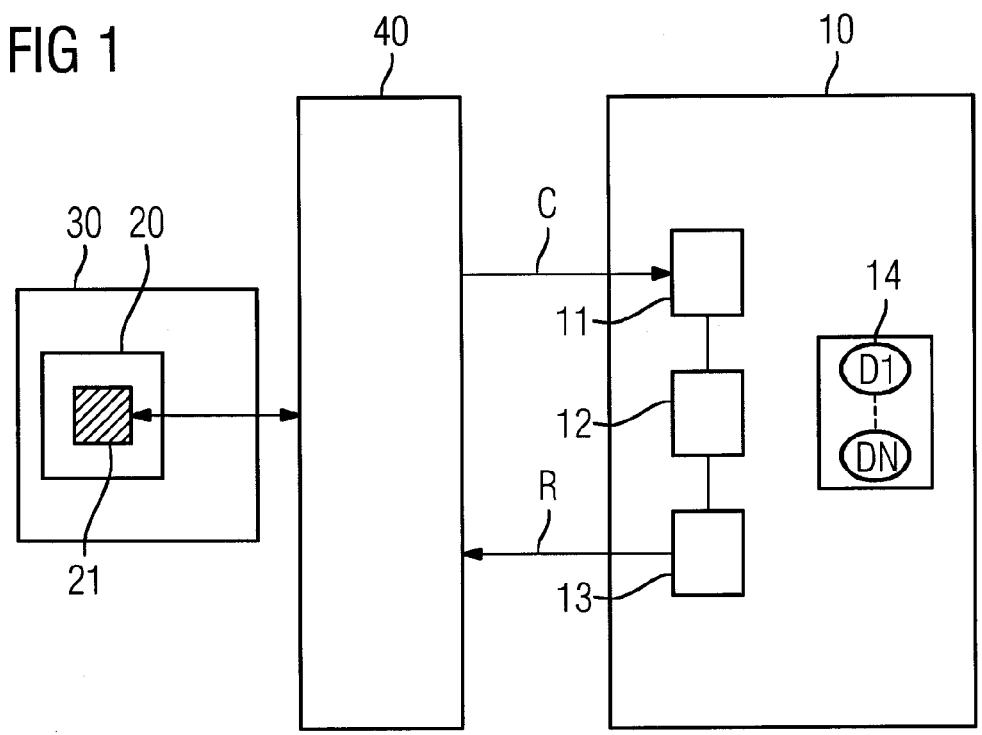
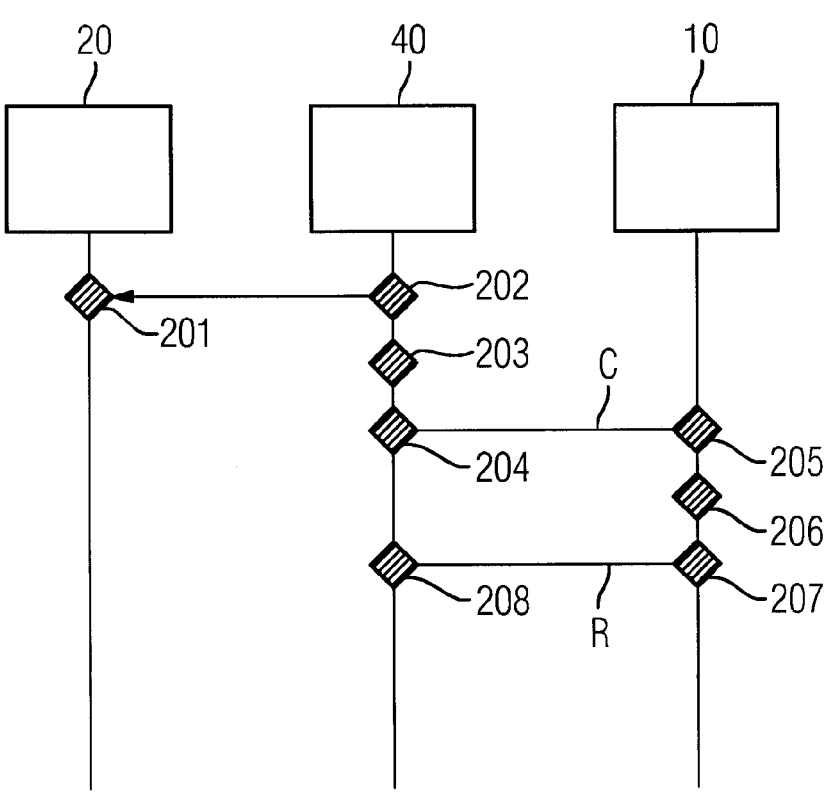

APPARATUS AND METHOD FOR MANAGING DATA RECORDS FOR ASSOCIATED SEALS FROM PRODUCTS

REFERENCE TO RELATED APPLICATIONS

This is a U.S. national stage of application No. PCT/EP2013/067596 filed Aug. 26, 2013. Priority is claimed on German Application No. 102012216764 filed Sep. 19, 2012, the content of which is incorporated herein by reference in its entirety.

BACKGROUND OF THE INVENTION

1. Field of the Invention

The present application relates to an apparatus and a method for managing data records for associated seals from products, such as appliances or objects, for example bottles or medication packagings.

2. Description of the Related Art

An example of a seal from a product is a security label. In this case, security labels exist that, following removal, can be recognized as invalid, e.g. by the appearance of an "Invalid" legend or by a checkerboard or diamond pattern. In addition, it is known practice to print a code, such as a piece of identification information, a consecutive number or a barcode, on security labels. However, it is not possible to read from these whether a seal has been broken.

In addition, in the case of drinks bottles and candy, it is known practice to print an access code, for example a password consisting of digits and letters, onto a label or a screw cap, so that the access code can be read only when the packaging has been opened. Conventionally, however, the access code needs to be typed manually by the user, e.g. in order to retrieve bonus information from a website of the manufacturer. Examples of such bonus information include comics or ringtones.

In addition, the use of PIN letters, e.g. for SIM mobile radio chip cards, is known. These involve the PIN being able to be read only after a protective label has been rubbed away or removed. This serves as evidence of first opening, so that the authorized recipient and user can check that another has not already obtained the PIN before him. In addition, it is common to code particular information, such as a URL (Uniform Resource Locator), a telephone number, an E-mail address or the like, as a two-dimensional barcode, for example as a data matrix code or as a QR code (Quick Response Code). By way of example, a two-dimensional barcode of this kind can be captured and decoded by the camera of a mobile telephone. Following decoding, the corresponding URL can be loaded and displayed by a web browser on, for example, the mobile telephone.

Furthermore, an electronic product code to identify a product is known. The product code may be coded as a barcode or RFID. Examples include product codes on medication packagings.

However, the user of such a product having a seal has no assurance that he is breaking the seal for the first time. Overall, the opening or breakage of a seal for a product is conventionally not automated and reliably capturable and also verifiable by a trustworthy entity.

Accordingly, it is an object of the present invention to overcome the above disadvantages.

SUMMARY OF THE INVENTION

In view of the foregoing, an apparatus for managing N data records from N associated seals for products is proposed. In this case, the respective seal comprises a code that is associated with the seal and is capturable by a capture appliance after the seal is broken. The apparatus includes a reception unit, a checking unit and a transmission unit. The reception unit is configured to receive a challenge message, sent by a capture appliance, with a code associated with one of the N seals. The checking unit is configured to check the received code for validity and for first breakage of the seal associated with the received code on the basis of the data record associated with the associated seal. The transmission unit is configured to send a response message, generated on the basis of the check, with a piece of status information pertaining to the first breakage of the seal associated with the received code to the capture appliance.

According to the invention, the capture appliance is sent the response message with the piece of status information pertaining to the first breakage of the seal. Hence, the user of the capture appliance is informed by the piece of status information whether the seal has been broken for the first time or not for the first time.

Advantageously, the apparatus is configured to manage the plurality of N data records for a corresponding plurality of N seals. In particular, the apparatus is a trustworthy entity and can also be called a seal server.

The seal can also be called a security label. The product may be in the form of a drink bottle, medication packaging, safety label or in the form of an object, such as a semiconductor chip, a sensor, a controller, a battery or a toner.

The code can also be called a seal breakage code. In one example, the capture appliance is a mobile telephone or a smartphone with an integrated camera.

The seal comprises a protective or concealing element that is removed so that the code is capturable or accessible. Therefore, it is necessary to overcome the physical protection to capture the code or seal breakage code. In one example, the seal breakage code is located in the interior of the product, for example of a packaging, e.g. printed on an inside on a package insert or on the product situated in the interior of the packaging, such as a medication blister or a medication vial, so that the code is accessible and hence capturable only after the packaging is opened. Alternatively, the seal breakage code is at least partially concealed by a label or a similar covering protective layer, so that it is capturable only after the protective layer is rubbed away or after the label is removed.

In one embodiment, the checking unit is configured to update the data record associated with the received code on the basis of the received challenge message.

The associated data record is advantageously updated on the basis of the received challenge message. A simple embodiment may involve a status flag for the first breakage of the associated seal from the data record being set or updated as appropriate. When the code associated with the respective data record is received for the first time, the status flag of the associated data record changes.

In a further embodiment, the challenge message comprises a timestamp, wherein the checking unit is configured to add the received timestamp to the data record associated with the received code in order to indicate a time of breakage of the associated seal.

Hence, the time of the first breakage of the associated seal can be stored, managed and provided for later applications. This is accompanied by the first use of the product. In addition, this allows a useful life to be managed.

In a further embodiment, the challenge message comprises a timestamp. In this case, the checking unit is configured to compare the received timestamp with an expiry date for the product. The expiry date is stored in the associated data record, wherein the transmission unit is configured to send a response message, generated on the basis of the check and the comparison, with the piece of status information pertaining to the first breakage of the seal associated with the received code and a piece of shelf-life information for the product from the associated seal.

The piece of shelf-life information makes it possible to ensure that the user is consuming only products that are within their shelf-life. Hence, it is possible to track whether the first opening is not already too long in the past and the product therefore needs to be disposed of. Particularly in the case of medications, this is very advantageous.

In a further embodiment, the respective data record for the respective seal comprises a status flag that indicates an unbroken state of the seal.

In one embodiment, the status flag is used to signal the unbroken state of the seal and, in its inverted version, also the broken state of the seal.

In a further embodiment, the respective data record for the respective seal comprises a number M of identifications from M authorized reception appliances.

For the respective seal, it is possible to manage a number M of authorized reception appliances. The number M may be different for the various seals.

In a further embodiment, the checking unit is configured to check the received code for validity and for the first breakage of the seal associated with the received code and to check consistency between an identity of the capture appliance that is received with the challenge message and the identifications of the authorized capture appliances, wherein the identifications are stored in the associated data record.

This ensures that only authorized capture appliances actually obtain a response message from the apparatus. Alternatively, the apparatus can also transmit a negative response message to unauthorized capture appliances. The use of the identification also allows the respective user to be associated with the product or the seal. As a result, who has opened or broken the seal is determined.

In a further embodiment, the reception unit is configured to receive a challenge message with the code associated with one of the N seals and with a checksum from the capture appliance. In this case, the checking unit is configured to check the received code for validity and for the first breakage of the seal associated with the received code and to check the checksum for correctness on the basis of the data record associated with the associated seal and stored in the memory. In addition, the transmission unit is configured to send a response message, generated on the basis of the check on the received code for validity and for the first breakage and on the received checksum for correctness, with the piece of status information to the capture appliance.

The apparatus updates the associated data record only if a correct checksum is contained in the challenge message. In this case, the checksum is used preferably as a password or access code in order to demonstrate a seal as actually opened. As a result, a data record associated with the seal cannot be updated as opened if the requisite checksum contained in the associated code was not contained in the challenge message.

In a further embodiment, the code comprises a barcode, a QR code, an internet address for the apparatus for managing the plurality N of the seals and/or a piece of access information for the apparatus for managing the plurality N of the seals. The QR code (Quick Response Code) is a two-dimensional code. The QR code may also be embodied as a micro-QR code, as a secure QR code or as an iQR code.

In a further embodiment, the transmission unit is configured to add to the response message a product description of the product associated with the received code or a link to a server for providing the product description. The product description allows the user to be provided with up-to-date information pertaining to the product in a simple manner.

The respective unit, reception unit, checking unit and transmission unit may be implemented in hardware and/or also in software. In the case of a hardware implementation, the respective unit may be in the form of an apparatus or in the form of part of an apparatus, for example in the form of a computer or in the form of a microprocessor. In the case of a software implementation, the respective unit may be in the form of a computer program product, in the form of a function, in the form of a routine, in the form of part of a program code or in the form of an executable object.

In a further embodiment, the apparatus is in the form of an HTTP-compatible server.

In a further embodiment, the apparatus has a memory for storing the N data records that are associated with the N seals.

In addition, a system having an apparatus as described above for managing N data records from N associated seals for products and a number of capture appliances that can be coupled to the apparatus for the purpose of capturing the codes of the N seals is proposed.

Furthermore, a method for managing N data records from N associated seals for products is proposed. In this case, the respective seal comprises a code that is associated with the seal and that is capturable by a capture appliance after the seal is broken. In a first step, a challenge message, sent by a capture appliance, with a code associated with one of the N seals is received. In a second step, the received code is checked for validity and for first breakage of the seal associated with the received code on the basis of the data record associated with the associated seal. In a third step, a response message, generated on the basis of the check, with a piece of status information pertaining to the first breakage of the seal associated with the received code is sent to the capture appliance.

In addition, a computer program product is proposed that prompts the performance of the method as explained above on a program-controlled device.

A computer program product such as a computer program can be provided or delivered by a server in a network as a storage medium, such as a memory card, USB stick, CD ROM, DVD, or else in the form of a downloadable file, for example. This can take place in a wireless communication network by virtue of the transmission of an appropriate file with the computer program product or the computer program, for example.

In addition, a data storage medium having a stored computer program with commands that prompt the performance of the method as explained above on a program-control device is proposed.

Furthermore, a seal that can be managed by the apparatus, explained in more detail above, is proposed. In addition to the code described above, the seal can also comprise a further code that is capturable by the capture appliance when the seal is unopened. For example, this further code can be capturable when the seal is unopened, i.e. it is destroyed when the seal is opened or broken, as a result of which it can no longer be captured by the capture appliance and is not recognized as a valid code.

In an alternative embodiment, the further code is also capturable when the seal has been opened, i.e. it is used for seal identification, regardless of the sealed or opened state. This further code allows the product to be tracked by a track & trace, e.g. a medication packaging along a supply chain. After the seal breakage code has been transmitted, the further code can be used to check that the packaging was already open.

In one embodiment, the seal breakage code allows a piece of information to be retrieved, e.g. a product description. In one embodiment, this is possible when the seal breakage code has been switched to an activated mode after the product from the externally freely accessible further code has been enabled by an authorized issuing point. This means that, regardless of whether the product has been issued by an authorized, licensed issuing point, the user can have his customized information displayed, e.g. including a warning.

When the seal breakage code and the further code are used, the concealing element used for the seal breakage code can be a removable label that is transparent or semitransparent, so that a portion of the seal breakage code lying beneath the label is capturable even when the applied label is in place.

The updating of the data record associated with the seal breakage can additionally lead to a modified piece of information being provided for the further code (for example being marked as invalid; access is prevented; or extended access is enabled). Thus, the response to a challenge message that contains the further code is dependent on whether the seal breakage code has already been transmitted to the apparatus at least once.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention that are described above and also the way in which they are achieved will become more clear and more distinctly comprehensible in connection with the following description of the exemplary embodiments, which are explained in more detail in connection with the drawings, in which:

FIG. 1 shows a block diagram of an exemplary embodiment of an apparatus for managing data records for associated seals from products;

FIG. 2 shows a flowchart for a first exemplary embodiment of a method for managing data records for associated seals from products.

In the figures, elements that are the same or have the same function have been provided with the same reference symbols, unless indicated otherwise.

DETAILED DESCRIPTION OF THE EXEMPLARY EMBODIMENTS

Figure 3:
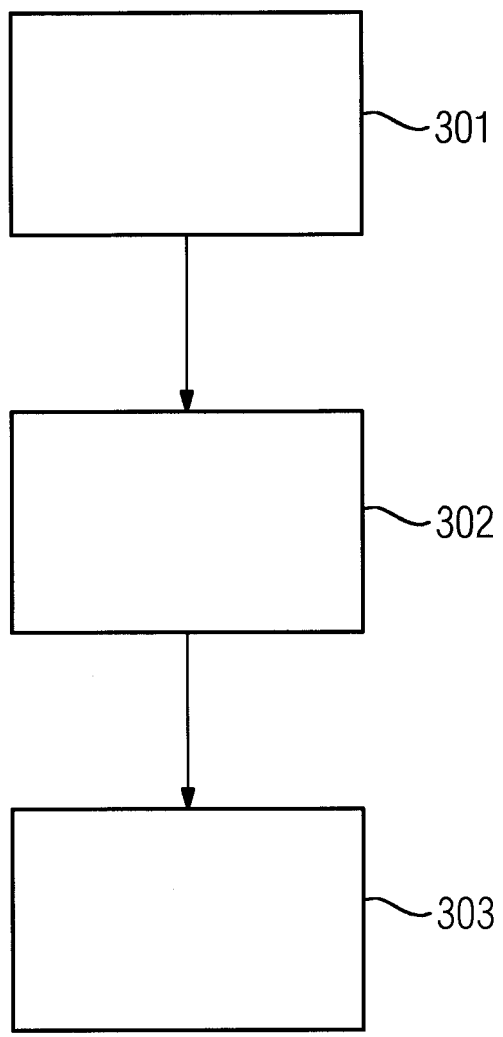
FIG. 3 shows a flowchart for a second exemplary embodiment of a method for managing data records for associated seals from products.

FIG. 1 shows a block diagram of a first exemplary embodiment of an apparatus 10 for managing data records D1-DN for associated seals 20 from products 30. The product 30 shown in FIG. 1 is equipped with a seal 20 having a code 21 that is capturable by a capture appliance 40 after the seal 20 is broken.

The respective seal 20 has an associated code 21 and an associated corresponding data record D1-DN stored on the apparatus 10. By way of example, the apparatus 10 is in the form of an HTTP-compatible server that comprises a memory 14 for storing the N data records D1-DN associated with the N associated seals 20.

By way of example, the code 21 of the seal 20 in FIG. 1 has the associated data record D1 from the apparatus 10. The apparatus 10 manages N data records D1-DN. To that end, the apparatus 10 has a memory 14 that stores the N data records D1-DN.

The apparatus 10 has a reception unit 11, a checking unit 12 and a transmission unit 13. The reception unit 11 is configured to receive a challenge message C sent by the capture appliance 40 with the code 21 associated with the seal 20.

That is to say that after the seal 20 from the product 30 is broken, the code 21 is capturable for the capture appliance 40. After the seal 20 is broken, the capture appliance 40 can capture the code 21 and generate a challenge message C that comprises the associated code 21. The code 21 may comprise a barcode, a QR code, an internet address for the apparatus 10 and/or a piece of access information for the apparatus 10. The challenge message C, together with a subsequent response message R, can form a challenge/response authentication. In particular, the challenge message C can comprise a timestamp.

The reception unit 11 forwards the received challenge message C to the checking unit 12. The checking unit 12 is configured to check the received code 21 for validity and for first breakage of the seal 20 associated with the received code 21 on the basis of the data record D1-DN associated with the associated seal 20. To this end, the checking unit 12 loads the associated data record D1-DN from the memory 14. In addition, the checking unit 12 may also be configured to update the corresponding data record D1-DN on the basis of the received challenge message C. In the example wherein the challenge message C comprises a timestamp, the checking unit can be configured to add the received timestamp to the corresponding data record D1-DN in order to indicate the time of first breakage of the associated seal 20.

The transmission unit 13 coupled to the checking unit 12 is configured to send a response message R, generated on the basis of the check, with a piece of status information pertaining to the first breakage of the seal 20 associated with the received code 21 to the capture appliance 40. Hence, the user of the capture appliance 40 receives a piece of status information about whether the code 21 transmitted by the capture appliance 40 was already used and hence whether the seal 20 was broken for the first time.

In addition, the transmission unit 13 is configured particularly to add a product description for the product 30 associated with the received code 21 to the response message R. Alternatively, the response message R can also have a link to a server for providing the product description added to it.

For the example above, wherein the challenge message C comprises a timestamp, the checking unit 12 can also compare the received timestamp with an expiry date for the product 30, which expiry date is stored in the associated data record D1-DN. In this example, the transmission unit 13 can be configured to generate the response message R on the basis of the check and the comparison. The response message R then comprises the piece of status information pertaining to the first breakage of the seal 20 associated with the received code 21 and also a piece of shelf-life information for the product 30 from the associated seal 20. The piece of shelf-life information can indicate whether or not a predetermined "best before date" for the product 30 has expired.

The respective data record D1-DN for the respective seal 20 preferably comprises a status flag that indicates whether or not the seal 20 is broken. Furthermore, the respective data record D1-DN for the respective seal 20 can comprise a number M of indications from M authorized reception appliances 40. In this embodiment, the checking unit 12 can be configured to not only check the validity of the received code 21 and the first breakage of the seal 20 associated with the received code 21, but also to check consistency between an identity, received with the challenge message C, of the challenging capture appliance 40 and the identifications of the authorized capture appliances 40, wherein the identifications are stored in the associated data record D1-DN. Only in the event of a positive consistency check will the transmission device 13 generate the response message R and transmit it to the challenging capture appliance 40.

In another example, the challenge message C comprises not only the code 21 associated with one of the N seals 20 but also a checksum. In that case, the checking unit 12 can be configured to check the received code 21 for validity and for the first breakage of the seal 20 associated with the received code 21 and also to check the checksum for correctness on the basis of the data record D1-DN associated with the associated seal 20. In this example, the transmission unit 13 is then prepared to send a response message R, generated on the basis of the check on the received code 21 for validity and for the first breakage and on the received checksum for correctness, with the piece of status information, to the capture appliance 40.

FIG. 2 shows a flowchart for a first exemplary embodiment of a method for managing data records D1-DN for associated seals 20 from products 30.

The example in FIG. 2 comprises steps 201-208, which relate to the seal 20, the capture appliance 40 and the apparatus 10. An example of the apparatus 10 is shown in FIG. 1.

In step 201, the seal 20 is broken, so that the code 21 is capturable by the capture appliance 40. In step 202, the breakage of the seal 20 is detected by the capture appliance 40.

Next, in step 203, a challenge message C is generated by the capture appliance 40, said challenge message comprising the captured code 21. In step 204, the generated challenge message C is transmitted to the apparatus 10. In step 205, the apparatus 10 receives the transmitted challenge message C. In step 206, the code 21 from the received challenge message C is checked for validity and for first breakage of the seal 20 associated with the received code 21 on the basis of the data record D1-DN associated with the associated seal 20.

In step 206, the check is taken as a basis for generating a response message R, which is transmitted from the apparatus 10 to the capture appliance 40 in step 207. In step 208, the capture appliance 40 receives the response message R sent. Hence, the user of the capture appliance 40 is provided with a piece of status information about the first breakage of the seal 20 associated with the received code 21.

FIG. 3 shows a flowchart for a second exemplary embodiment of a method for managing data records D1-DN for associated seals from products 30. The method in FIG. 3 is carried out particularly by an apparatus 10 from FIG. 1. The respective seal 20 comprises a code 21 that is associated with the seal 20 and that is capturable by a capture appliance 40 after the seal 20 is broken.

The exemplary embodiment in FIG. 3 comprises the following steps 301-303:

In step 301, a challenge message C, sent by a capture appliance 40, is received by the apparatus 10. The challenge message C comprises a code 21 that is associated with one of the N seals 20.

In step 302, the received code 21 is checked for validity and for first breakage of the seal 20 associated with the received code 21. The check is effected on the basis of the data record D1-DN associated with the associated seal 20.

In step 303, a response message R generated on the basis of the check is sent to the capture appliance 40. The response message R comprises a piece of status information pertaining to the first breakage of the seal associated with the received code 21.

Although the invention has been illustrated and described in more detail via the preferred exemplary embodiment, the invention is not restricted by the examples disclosed, and other variations can be derived therefrom by a person skilled in the art without departing from the scope of protection of the invention. Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus configured to manage N data records for N associated security seals of products, the apparatus comprising:
   a receiver which receives a challenge message, sent by a capture appliance, having a code associated with one of the N associated security seals;
   a checker which checks the received code for validity and for a first breakage of the security seal associated with the received code based on the data record associated with the associated security seal; and
   a transmitter which sends a response message to the capture appliance, which is generated based on the check, along with a piece of status information pertaining to the first breakage of the security seal associated with the received code;
   wherein the associated security seal comprises a code which is associated with the security seal, said security seal being captured by the capture appliance after the security seal is broken.

2. The apparatus as claimed in claim 1, wherein the checker updates the data record associated with the received code based on the received challenge message.

3. The apparatus as claimed in claim 1, wherein the challenge message comprises a timestamp; and
wherein the checker adds the received timestamp to the data record associated with the received code to indicate a time of a breakage of the associated security seal.

4. The apparatus as claimed in claim 1, wherein the challenge message comprises a timestamp;
wherein the checker compares the received timestamp with an expiry date for the product;
wherein the expiry date is stored in the associated data record; and
wherein the transmitter sends a response message, generated based on the check and the comparison, with the piece of status information pertaining to the first breakage of the security seal associated with the received code and a piece of shelf-life information for the product from the associated security seal.

5. The apparatus as claimed in claim 1, wherein the respective data record for the respective seal comprises a status flag that indicates an unbroken state of the security seal.

6. The apparatus as claimed in one of claim 1, wherein the respective data record for the respective security seal comprises an M number of identifications from M authorized reception appliances.

7. The apparatus as claimed in claim 6, wherein the checker checks the received code for validity and for the first breakage of the security seal associated with the received code and to check consistency between an identity of the capture appliance which is received with the challenge message and the identifications of the authorized capture appliances, the identifications being stored in an associated data record.

8. The apparatus as claimed in claim 7, wherein the transmitter sends a response message to the capture appliance, which is generated based on the check and the consistency check, along with the piece of status information pertaining to the first breakage of the security seal associated with the received code.

9. The apparatus as claimed in claim 1, wherein the receiver receives a challenge message with the code associated with one of the N associated security seals and with a checksum from the capture appliance
wherein the checker checks the received code for validity and for the first breakage of the security seal associated with the received code and checks the checksum for correctness based on the data record associated with the associated security seal; and
wherein the transmitter sends a response message to the capture appliance, which is generated based on the check on the received code for validity and for the first breakage and on the received checksum for correctness, along with the piece of status information.

10. The apparatus as claimed in claim 1, wherein the code comprises at least one of: a barcode, a QR code, an interne address for the apparatus for managing a plurality N of the security seals and a piece of access information for the apparatus for managing the plurality N of the security seals.

11. The apparatus as claimed in claim 1, wherein the transmitter adds to the response message a product description of the product associated with the received code or a link to a server for providing the product description.

12. The apparatus as claimed in claim 1, wherein the apparatus comprises an Hypertext Transfer Protocol (HTTP) compatible server having a memory for storing the N data records associated with the N associated security seals.

13. A system comprising:
an apparatus configured to manage N data records for N associated security seals of products, the apparatus comprising:
a receiver which receives a challenge message, sent by a capture appliance, having a code associated with one of the N associated security seals;
a checker which checks the received code for validity and for a first breakage of the security seal associated with the received code based on the data record associated with the associated security seal; and
a transmitter which sends a response message to the capture appliance, which is generated based on the check, along with a piece of status information pertaining to the first breakage of the security seal associated with the received code, a respective security seal comprising a code which is associated with the security seal, said security seal being captured by a capture appliance after the security seal is broken; and
a plurality of capture appliances, each of said capture appliances being operably coupleable to the apparatus to capture codes from the N associated security seals.

14. A method for managing N data records for N associated security seals of products, each respective seal comprising a code which is associated with the security seal and captured by a capture appliance after the security seal is broken, the method comprising:
receiving a challenge message, sent by the capture appliance, along with a code associated with one of the N associated security seals at an apparatus;
checking the received code at the apparatus for validity and a first breakage of the security seal associated with the received code based on the data record associated with the associated security seal; and
sending a response message from the apparatus to the capture appliance, which is generated based on the check, with a piece of status information pertaining to the first breakage of the security seal associated with the received code to provide an indication at the capture appliance of whether the security seal has been broken for the first time.

15. A non-transitory computer-readable medium having stored thereon a plurality of program instructions which, when executed by one or more processors, cause an electronic device to manage N data records for N associated security seals of products, each respective seal comprising a code which is associated with the security seal and captured by a capture appliance after the security seal is broken, the program instructions comprising:
program code for receiving a challenge message, sent by the capture appliance, along with a code associated with one of the N associated security seals at an apparatus;
program code for checking the received code at the apparatus for validity and a first breakage of the security seal associated with the received code based on the data record associated with the associated security seal; and
program code for sending a response message from the at the apparatus to the capture appliance, which is generated based on the check, with a piece of status information pertaining to the first breakage of the security seal associated with the received code to provide an indication of whether the security seal has been broken for the first time.

* * * * *